United States Patent [19]

Schnell et al.

[11] Patent Number: 4,844,275
[45] Date of Patent: Jul. 4, 1989

[54] NON-METALLIC ELECTRICAL CONNECTION HOUSING

[75] Inventors: Kenneth R. Schnell, South Bend, Ind.; Robert W. Jorgensen, Niles, Mich.

[73] Assignee: Hubbell Incorporated, Orange, Conn.

[21] Appl. No.: 214,612

[22] Filed: Jul. 1, 1988

[51] Int. Cl.[4] .............................................. H02G 3/08
[52] U.S. Cl. ..................................... 220/3.9; 220/3.7; 174/57; 174/58
[58] Field of Search ........................... 220/3.3, 3.7, 3.9; 174/48, 53, 57, 58

[56] References Cited

U.S. PATENT DOCUMENTS

| | | | |
|---|---|---|---|
| 1,808,011 | 6/1931 | Barnett | 220/3.9 |
| 1,814,449 | 7/1931 | Morgenstern | 220/3.9 |
| 2,214,968 | 9/1940 | MacMillen | 220/3.9 |
| 3,863,037 | 1/1975 | Schindler et al. | 174/58 |
| 4,057,164 | 11/1977 | Maier | 174/58 |
| 4,214,668 | 7/1980 | Neff et al. | 220/3.3 |
| 4,265,365 | 5/1981 | Boteler | 220/3.3 |
| 4,315,100 | 2/1982 | Baslbeck et al. | 174/51 |
| 4,408,695 | 10/1983 | Balkwill et al. | 174/57 |
| 4,577,055 | 3/1986 | Wuertz | 174/48 |

OTHER PUBLICATIONS

RACO (All-Steel Equipment Inc.) Drawing C-4-5782, "Assembly: #208 Outlet Box 4" Square-1½" Deep--Welded", dated 9/16/64.

Primary Examiner—A. Michael Chambers
Attorney, Agent, or Firm—Jerry M. Presson; Walter C. Farley

[57] ABSTRACT

An electrical housing includes mounting flanges and mounting ear for positioning and attaching the housing against a stud. Rearwardly extending brackets permit attachment of the housing against the open side of a metal stud rigidly and securely, and also provide for bracing of the housing between the inner surfaces of wall panels mounted on the studs. Bracket extensions are provided to accommodate wider studs and a cover and barrier assembly completes the housing.

10 Claims, 4 Drawing Sheets

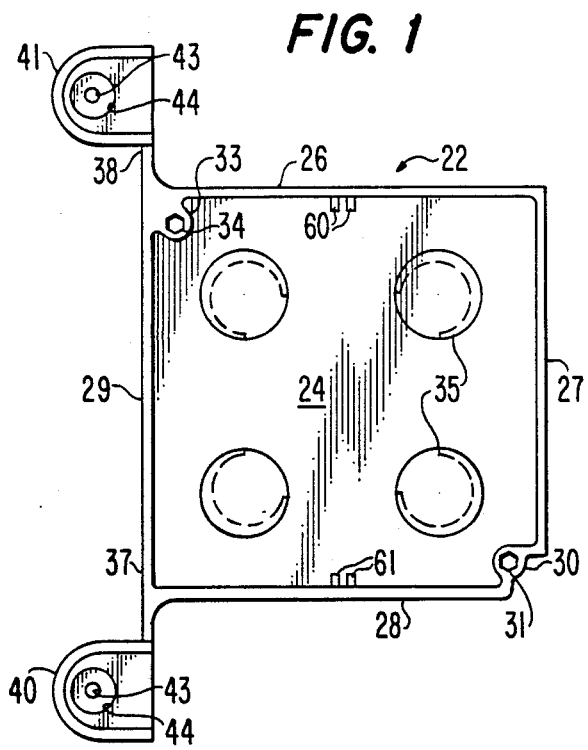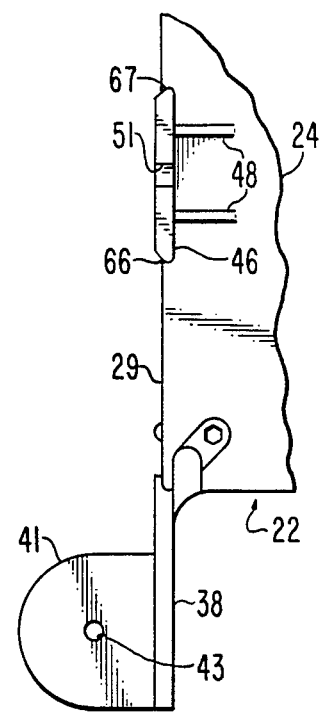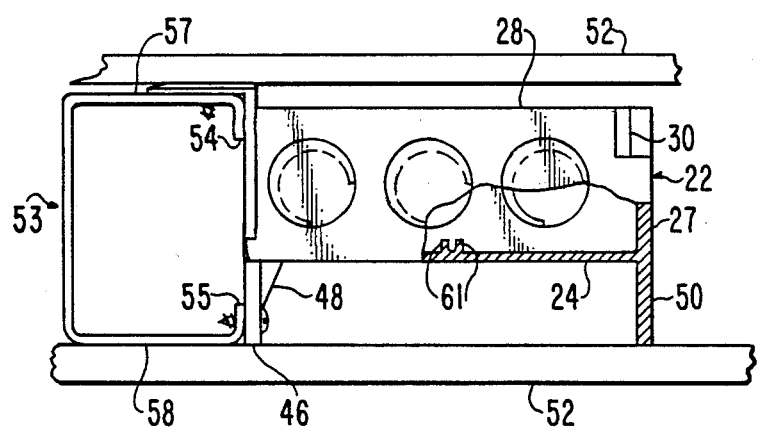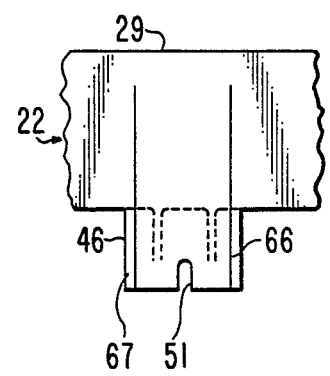

NON-METALLIC ELECTRICAL CONNECTION HOUSING

This invention relates to a non-metallic housing for use with a raised cover for receiving electrical devices such as switches, outlets and the like and for use in completing electrical connections therein, the housing having features which facilitate its attachment to metal studs and which provide for rigid bracing within a wall structure.

BACKGROUND OF THE INVENTION

Relatively recent innovations in building construction techniques and in the use of electrical non-metallic tubing systems (ENT systems) have increased the need for housings having features which facilitate mounting and provide increased bracing rigidity. Among the construction techniques are the use of metal studs, commonly steel, which are in the shape of a C having rather square corners when viewed in cross section. These studs are positioned vertically with the open side of the stud facing toward the next adjacent stud, leaving two side faces (the top and bottom of the C) available for the attachment of wall panels such as drywall or the like.

Housings for switches and outlets must then be attached to one or both of the other two faces, frequently the side which is mostly open. These studs have relatively short inwardly extending flanges into which fasteners can be driven, but each such flange provides a rather narrow support surface. It is therefore necessary to position the box carefully and to provide some other technique for bracing the housing in the installed location.

In addition, the metal studs are furnished in either one of two sizes, one size having a depth of 2.5 in. measured in the direction perpendicular to the wall panels to be attached thereto, and the other having a dimension of 3.625 in. in that same direction.

SUMMARY OF THE INVENTION

An object of the present invention is to provide a housing which has structural members positioned to facilitate mounting when used in conjunction with metal or other studs.

A further object is to provide such a housing which can be firmly braced against a stud, whether mounted on the open or closed side.

Yet another object is to provide such a housing which can accommodate either of the commonly used sizes of studs and which can receive a suitable cover and electrical barrier for dividing the interior of the housing into suitable compartments.

A still further object is to provide such a housing having knockouts, such as eccentric knockouts, to accommodate conduit of various sizes such as the ½", ¾" and 1" trade sizes.

Briefly described, the invention includes a molded electrical connection housing having an open front and attachable to a metal stud of the type having a rectangular, generally C-shaped cross section, the housing including a box having four side walls, a back wall and an open front, the depth of the box being significantly less than the depth of the stud perpendicular to the wall panels. A plurality of the walls have knockouts to allow attachment of conduits thereto. First and second attachment flanges extend in opposite direction from the end of one of the side walls, the flanges lying substantially in the same plane as the side wall from which they extend. First and second attachment ears extend perpendicularly from a front edge of the flanges, respectively, the ears lying on the opposite side of the side wall from the open front of the box. A support bracket extends perpendicularly outwardly, to the rear, from the back wall and lies in substantially the same plane as the flanges, the length of the bracket being selected such that the combined depth of the box and length of the support bracket in the direction perpendicular to wall panels mounted on the stud substantially equals the dimension of the stud in that same direction so that the housing can be mounted on the side of the stud having the opening therein and will span the opening so as to be supported against edges of the stud on both sides of the opening therein.

An additional extension bracket is also provided, the extension bracket being shaped for attachment to the support bracket to increase the total depth of the box and bracket assembly, allowing use with a stud having a greater dimension between its wall panel supporting faces.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification, and wherein:

FIG. 1 is a front elevation of a housing in accordance with the invention;

FIG. 2 is a top plan view, partly in section, of the housing of FIG. 1 mounted on a typical metal stud;

FIG. 3 is a partial side elevation of the housing of FIGS. 1 and 2 showing a support bracket thereon;

FIG. 4 is a partial rear elevation of the box of FIGS. 1 and 2 also showing a support bracket;

DESCRIPTION OF THE PREFERRED EMBODIMENTS

Figure 5:
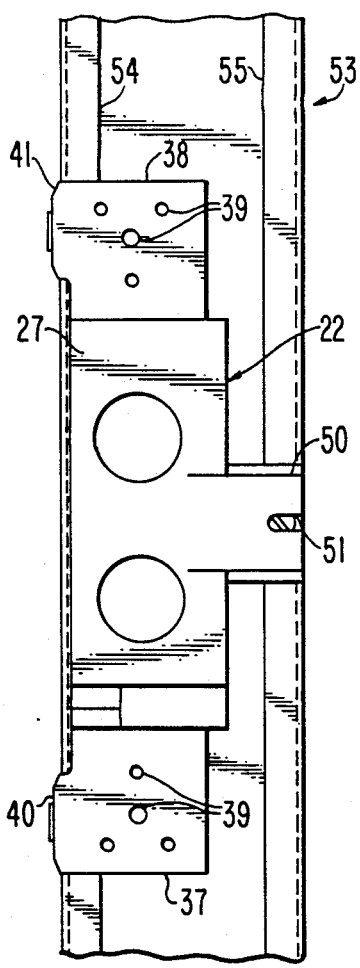
FIG. 5 is a side elevation of the housing of FIGS. 1 and 2 mounted on a stud.

Referring first to FIGS. 1–4, a housing in accordance with the invention includes a rectangular parallelepiped box 22 having a rear wall 24 and side walls 26, 27, 28 and 29. The housing is unitarily molded in polyvinyl chloride (PVC) and is primarily intended to be used in conjunction with the electrical non-metallic tubing systems which involve molded, corrugated tubing and specialized couplers which, per se, are not part of the present invention and will not be further described. At the junction of walls 27 and 28 is a thickened portion 30 having a hexagonally-shaped hole 31 for receiving a fastener. Similarly, at the diagonally opposite corner where walls 26 and 29 join, a thickened region 33 is formed with an opening 34 also to receive a fastener. The spacing between these holes, as well as the general dimensions of the box, are selected to accommodate standard electrical covers. Rear wall 24 is formed with a plurality of knockouts 35 which can be selectively removed to provide openings for connectors by which conduit can be attached to the box to provide passageways for wires. Knockouts are also provided in the side walls.

At opposite ends of side wall 29 are extensions forming first and second attachment flanges 37 and 38 which lie in substantially the same plane as wall 29. These attachment flanges can be regarded as lateral extensions of wall 29 and, as seen in FIG. 5, these flanges are provided with a plurality of openings 39 through which fasteners can be inserted for attaching the housing to a stud or other surface. First and second attachment ears 40 and 41 protrude outwardly from the front edges of flanges 37 and 38, respectively, at right angles to the attachment flanges. These attachment ears are provided with holes 43 surrounded by recesses 44 so that a fastener can be inserted through the ears and into a stud, the recesses 44 being dimensioned to receive the head of the fastener for minimizing the deformation of wall board or other wall paneling installed over the stud.

At the rear edge of wall 29 is a support bracket 46 which is unitarily formed on the box along with triangular stiffening webs 48. An additional support bracket 50 protrudes from the rear edge of side wall 27. Brackets 46 and 50 can be provided with slots 51 for attachment to a stud or to an additional device, as will be described.

FIGS. 2 and 5 show the box attached to a typical metal stud 53 which, as best seen in FIG. 2, is generally C-shaped with relatively short inwardly extending flanges 54 and 55 defining a longitudinal opening which extends the full length of the stud. In a conventional structure, wall panels 52 such as drywall or the like would normally be mounted against side faces 57 and 58 of the stud. Accordingly, any electrical housing must be mounted to the stud and reside in the intermediate space defined by the inner surfaces of those panels. It will also be recognized that the depth of the box to house an electrical device must be less than the depth of the space defined by the wall panels to permit connection of conduit to the knockouts in wall 24 within the wall cavity. Brackets 46 and 50 are therefore dimensioned so that the lengths of the brackets together with the depth of the box equals the depth of the stud between surfaces 57 and 58. As will be recognized, the term "depth" is used herein to describe dimensions measured perpendicular to the stud surfaces against which wall panels are to be mounted.

Attachment ears 40 and 41 mounted on top of and perpendicular to side mounting brackets 37 and 38 allow for quick installation and take the guess-work out of properly positioning the box against the wall stud. The ears position the box at the correct "set back" mounting position on the stud. Bracket 48 effectively extends the side wall 29 of the box so that, when the box is mounted against the open side of a stud, the mounting side of the housing spans the gap defined by flanges 54 and 55, rigidly securing the box to the stud. In addition, bracket 50 abuts the inner surface of the wall panel mounted against surface 58, thereby trapping the other end of the box between the wall panels.

Figure 13:
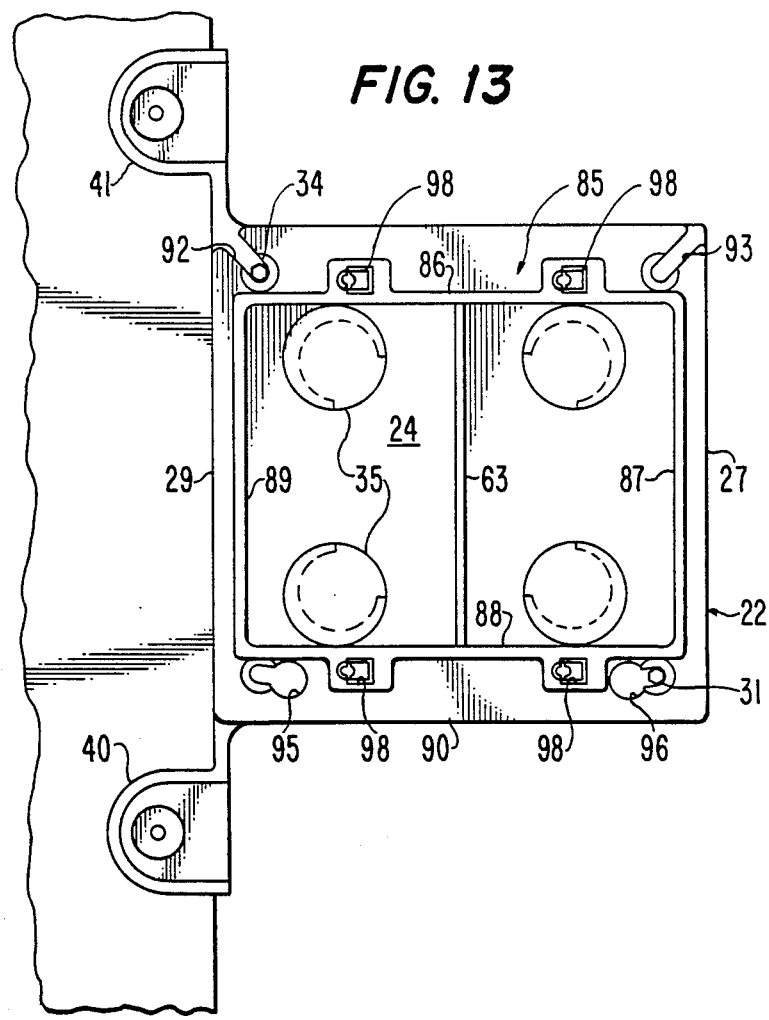
FIG. 13 is a top plan view, partially in section, of the assembly of FIG. 12.
Figure 12:
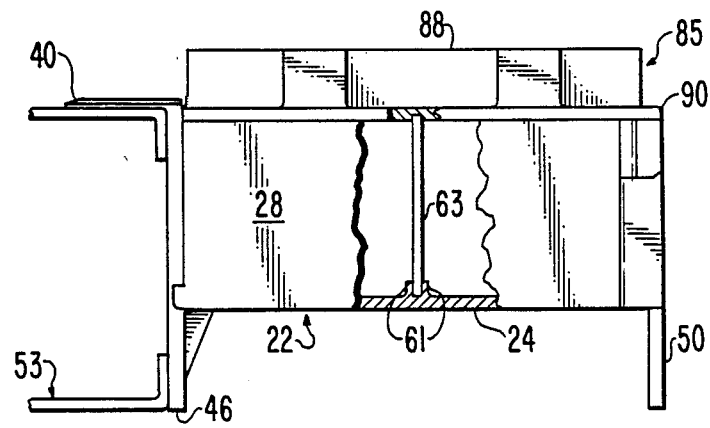
FIG. 12 is a front elevation of the housing of FIGS. 1 and 2 with a cover positioned thereon.
Figure 15:
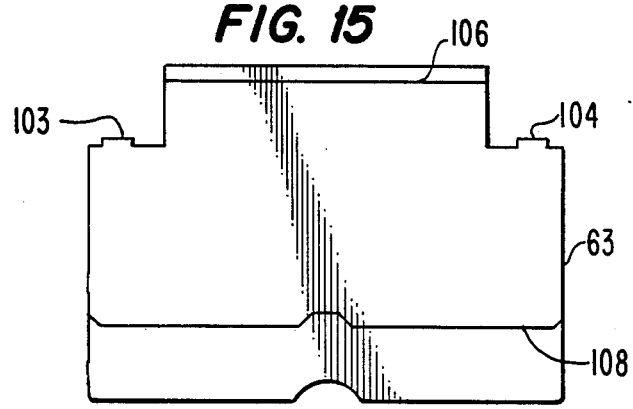
FIG. 15 is a side elevation of a barrier usable as illustrated in FIGS. 12 and 13.

Within box 22 are pairs of small projections 60 and 61 formed at the corners where wall 24 meets side walls 26 and 28 for receiving the lower corners of a barrier 63 which is shown by itself in FIG. 15 and installed in the housing in FIGS. 12 and 13.

As shown in FIGS. 2 and 5, the housing thus far described is conveniently attachable to a stud of the size of stud 53 which is conventionally a 2.5 in. stud, i.e., the depth dimension between surfaces 57 and 58 is nominally 2.5 in. However, when attaching the housing to a 3.625 in. stud, brackets 46 and 50 would clearly be too short to provide the necessary bracing. For this purpose, a bracket extension 65, shown in FIGS. 6–10, is provided. As best seen in FIG. 4, bracket 46 is in the shape of an elongated trapezoid, in section, having tapered side edges 66 and 67. Extension 65 is formed at one end with arms 69 and 70, the inner surfaces of which are formed with recesses 71 and 72, respectively, which are shaped and dimensioned to snugly receive the tapered edges of bracket 46. Arms 69 and 70 are joined in a generally U-shaped configuration, the bottom of this U having a protrusion 74 which is positioned and shaped to enter slot 51. Between arms 69 and 70, most of the material is removed, allowing the arms to be slightly flexible so that when the extension bracket is pushed onto bracket 46, some flexing of the arms occurs, resulting in a firm frictional engagement which requires no additional fasteners.

At the other end of extension 65, a bracket portion 76 is provided with a slot 77 similar to slot 55 and is formed with stiffening ribs 79 to give portion 76 rigidity.

Figure 11:
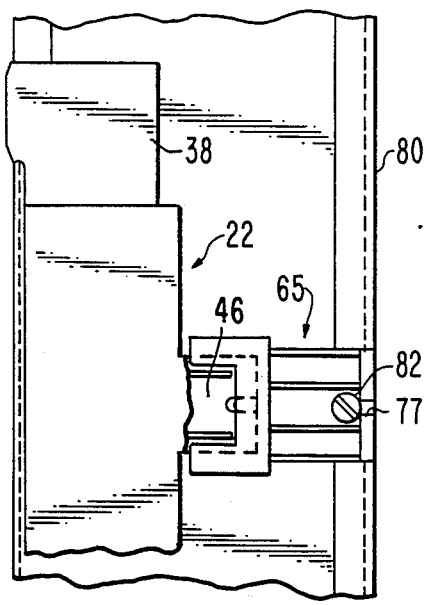
FIG. 11 is a partial side elevation of a housing in accordance with the invention with an extension bracket mounted thereon, the assembly being mounted on a typical wide stud.
Figure 10:
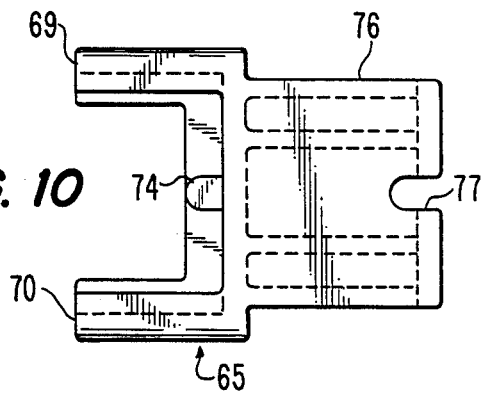
FIGS. 6–10 are front, left end, right end, side and rear elevations of an extension bracket usable with the housing of FIGS. 1 and 2.
Figure 9:
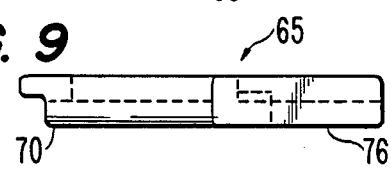
Figure 7:
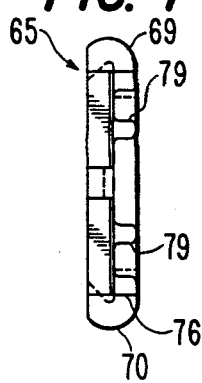
Figure 6:
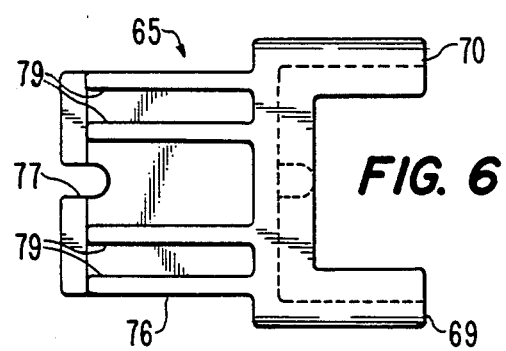
Figure 8:
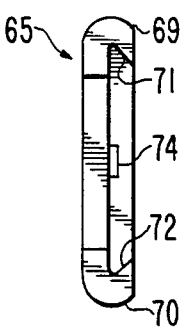

As seen in FIG. 11, housing 20 with an extension bracket 65 attached thereto can be mounted on a stud 80 which has a shape substantially identical to stud 53 but which has a depth dimension of 3.625 in. A suitable fastener 82, such as a sheet metal screw, can be used to attach extension 65 to a flange of the stud. Bracket 50 can be attached to a short section of a "dummy" stud which floats within the wall cavity but which has a surface abutting the inner surface of the wall panel behind the box, thereby providing support for the free end of the housing. Alternatively, a second extension bracket 65 can be used. The remaining portions of the housing are unchanged and will therefore not be described again.

Figure 14:
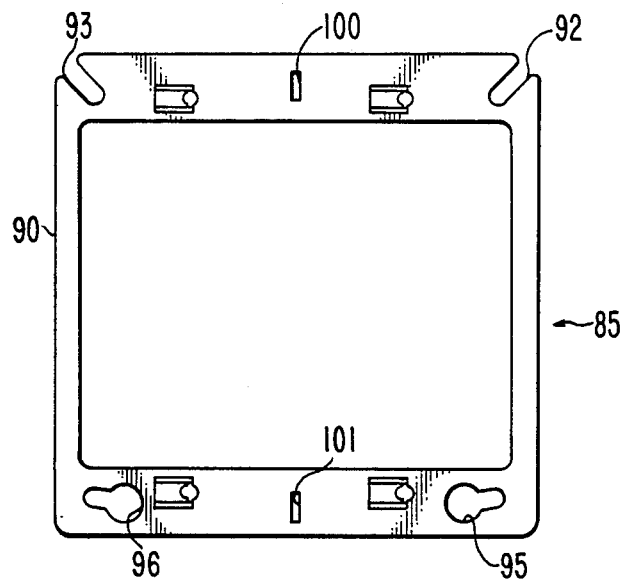
FIG. 14 is a rear elevation of the cover shown in FIGS. 12 and 13.

As will be recognized from FIG. 2, when panels of drywall or other material are mounted against surfaces 57 and 58 of stud 53, or the analogous surfaces of stud 80, the open front of box 22 will be recessed behind the paneling since the front edges of the side walls are recessed about 0.090" behind the plane containing surface 57. In order to provide a mounting device for electrical apparatus such as switches or the like in a plane at, or closely approximating, the outer surface of the wall panels, a cover 85 is provided as illustrated in FIGS. 12-14. Cover 85 is of a configuration which is similar to a conventional tile cover having side walls 86, 87, 88 and 89 joined to form a short rectangular tube. At the base of this tube is a generally rectangular, outwardly extending flange 90, the outer dimensions of which are substantially the same as the outer dimensions of box 22. Flange 90 has a thickness of 0.090" so that, when the cover is placed against the front of box 28, the exposed outer face of flange 90 lies in the same plane as surface 57. Two corners of flange 90 are provided with diagonally inwardly extending slots 92 and 93, the inner limits of which are countersunk to receive the head of a fastener. In the position shown, slot 92 is aligned with hole 34 in box 22. At the other corners, flange 90 is provided with keyhole-shaped holes 95 and 96, the smaller ends of which are also countersunk to receive a fastener head and provide a flush finish. This smaller portion of hole 96 aligns with opening 31 in the particular mounting arrangement shown. The fasteners are omitted for clarity.

Side walls 86 and 88 of the cover are provided with mounting means 98 for receiving screws for mounting switches, outlets or the like on the cover. The screw-receiving devices 98 may be constructed in accordance with U.S. Pat. No. 4,315,100, Haslbeck, assigned to the same assignee as the present application, the content of which is incorporated herein by reference. These devices allow a screw to be pushed into the screw receiving means and then turned a few turns to actuate a cam mechanism which tightly engages the screw.

As will be recognized, the height of the walls as shown in FIG. 13 can be selected to accommodated the particular wall panel material which is being used.

On the rear surface of flange 90, as seen in FIG. 14, are formed rectangular indentations 100 and 101 which are positioned to receive tabs 103 and 104 formed on the top of barrier 63. As best seen in FIG. 13, the bottom corners of barrier 63 are engaged by the pairs of projections 60,61 and the top is engaged by the entrance of tabs 103 and 104 into recesses 100 and 101, thereby firmly securing the barrier which thus divides the interior of box 22 into separate compartments.

As seen in FIG. 15, barrier 63 can be provided with "V" grooves 106 and 108 which allow the barrier to be used with housings and covers of different sizes. The barrier is used as shown with a 2½" deep box. For use in a 1½" deep box, the barrier is broken apart at groove 108 and the lower part is discarded. If a ½ deep cover is used, the strip defined by groove 106 is broken off. As shown, the barrier is used with a ⅝" cover.

While certain advantageous embodiments have been chosen to illustrate the invention, it will be understood by those skilled in the art that various changes and modifications can be made therein without departing from the scope of the invention as defined in the appended claims.

What is claimed is:

1. A molded electrical connection housing attachable to an open side of a metal stud of the type having a rectangular, generally C-shaped cross-section with opposite side surfaces of the stud being available to form supports for wall panels, the housing comprising the combination of
    a box having four side walls, a back wall and an open front, the depth of said box being significantly less than the depth of the stud perpendicular to the wall panels;
    means defining knockouts in a plurality of said walls;
    first and second attachment flanges extending in opposite directions from ends of one of said side walls, said flanges lying substantially in the same plane as said one of said side walls;
    first and second attachment ears extending perpendicularly from a front edge of said flanges, respectively, said ears lying on the opposite side of said one of said side walls from said open front; and
    a support bracket extending perpendicularly outwardly from said back wall and lying in substantially the same plane as said flanges, the length of said bracket being selected such that the combined dimensions of said box and said support bracket in a direction perpendicular to said wall panels substantially equals the dimension of said stud in the same direction, whereby said housing can be mounted on the side of said stud having the opening therein and spans said opening so as to be supported against edges of said stud on both sides of the opening therein.

2. A housing according to claim 1, wherein said box further comprises
    a substantially planar dividing wall for separating the interior of said box into compartments, said dividing wall having a back edge, a substantially straight front edge and side edges, said front edge having first and second spaced locking tabs protruding therefrom; and
    means formed on an inner surface of said back wall defining slots for receiving edges of said dividing wall.

3. A housing according to claim 2 wherein said side walls include walls for receiving fasteners for attachment of a cover to said box.

4. A housing according to claim 2 wherein said side walls include means for receiving fasteners for attachment of a cover to said box.

5. A housing according to claim 2 and further comprising a cover comprising
    four orthogonal walls defining a rectangular tube;
    a generally planar flange extending outwardly from one end of said tube;
    means defining openings through said planar flange through which fasteners can pass to attach said cover to said open side of said box with said tube extending away from said box and with one surface of said flange facing said box; and means defining recesses in said one surface of said flange for receiving said locking tabs of said dividing wall.

6. A housing according to claim 4 and further comprising a cover comprising
    four orthogonal walls defining a rectangular tube;
    a generally planar flange extending outwardly from one end of said tube;
    means defining openings through said planar flange through which fasteners can pass to attach said cover to said open side of said box with said tube extending away from said box and with one surface of said flange facing said box; and means defining recesses in said one surface of said flange for receiving said locking tabs of said dividing wall.

7. A housing according to claim 6 and further comprising a second support bracket extending rearwardly from a second side wall of said box in parallel spaced relationship with the first said support bracket, the length of said support brackets being chosen so that the total depth of said box with each of said support brackets is substantially equal to the spacing between the inner surfaces of wall panels mounted on said studs whereby, when wall panels are so mounted, said box is engaged by said wall panels and braced therebetween.

8. A housing according to claim 1 and further comprising a second support bracket extending rearwardly from a second side wall of said box in parallel spaced relationship with the first said support bracket, the lengths of said support brackets being chosen so that the total depth of said box with each of said support brackets is substantially equal to the spacing between the inner surfaces of wall panels mounted on said studs whereby, when wall panels are so mounted, said box is engaged by said wall panels and braced therebetween.

9. A housing according to claim 1 wherein said box further comprises a substantially planar dividing wall for separating the interior of said box into compartments, said dividing wall having a back edge, a substantially straight front edge and side edges, said front edge having first and second spaced locking tabs protruding therefrom; and means formed on an inner surface of said back wall defining slots for receiving edges of said dividing wall.

10. An open-front, molded electrical connection housing attachable to an open side of either of two sizes of metal stud of the type having a rectangular, generally C-shaped cross-section with opposite side surfaces of the stud being available to form supports for wall panels and wherein the depth of one size of stud perpendicular to the wall panels is greater than the depth of the other size of stud in the same direction, the housing comprising the combination of a box having four side walls, a back wall and an open front, the depth of said box being significantly less than the depth of either of said sizes of stud;

means defining knockouts in a plurality of said walls;

first and second attachment flanges extending in opposite directions from ends of one of said side walls, said flanges lying substantially in the same plane as said one of said side walls;

first and second attachment ears extending perpendicularly from a front edge of said flanges, respectively, said ears lying on the opposite side of said one of said side walls from said open front;

a support bracket extending perpendicularly outwardly from said back wall and lying in substantially the same plane as said flanges, the length of said bracket being selected such that the combined dimensions of said box and said support bracket in a direction perpendicular to said wall panels substantially equals the dimension of said smaller size stud in the same direction, whereby said housing can be mounted on said smaller size stud and supported against edges of said stud on both sides of the opening therein; and an extension bracket selectively attachable to said support bracket to increase the total length of said bracket and thereby the depth of said housing with said brackets attached to be substantially equal to the dimension of said larger size stud in the same direction.

* * * * *